(12) United States Patent
Zhang et al.

(10) Patent No.: US 11,791,923 B2
(45) Date of Patent: Oct. 17, 2023

(54) METHOD FOR TRANSMITTING SIGNAL, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhi Zhang, Dongguan (CN); Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/494,263

(22) PCT Filed: Mar. 15, 2017

(86) PCT No.: PCT/CN2017/076856
§ 371 (c)(1),
(2) Date: Sep. 13, 2019

(87) PCT Pub. No.: WO2018/165927
PCT Pub. Date: Sep. 20, 2018

(65) Prior Publication Data
US 2020/0137700 A1    Apr. 30, 2020

(51) Int. Cl.
*H04W 56/00* (2009.01)
*H04W 72/23* (2023.01)
(Continued)

(52) U.S. Cl.
CPC ....... *H04J 11/0073* (2013.01); *H04J 11/0076* (2013.01); *H04J 11/0079* (2013.01);
(Continued)

(58) Field of Classification Search
None
See application file for complete search history.

(56) References Cited

U.S. PATENT DOCUMENTS

| 8,446,869 B2 | 5/2013 | Lee |
| 8,548,086 B2 | 10/2013 | Lo |
| (Continued) | | |

FOREIGN PATENT DOCUMENTS

| CN | 1220801 A | 6/1999 |
| CN | 101588336 A | 11/2009 |
| (Continued) | | |

OTHER PUBLICATIONS

Huawei Hisilicon ZTE ZTE Microelectronics ITL Motorola: "WF on SS burst set composition and SS-block Index Indication", 3GPP Draft; R1-1703832 Wf on SS Burst Set Composition and SS-Block Index Indication_V4, 3rd Generation Partnership Project (3GPP),, vol. RAN WG1, No. Athens, Greece; Jan. 13, 2017-Jan. 17, 2017 Feb. 16, 2017 (Feb. 16, 2017), XP051236632, www.3gpp.org/ftp/tsg_ran/WG1_RL1/TSGR1_88/Docs/ [retrieved on Feb. 16, 2017] * pp. 2, paragraph Alt 4 * * pp. 2, line 1 *.
(Continued)

*Primary Examiner* — Faruk Hamza
*Assistant Examiner* — Cassandra L Decker
(74) *Attorney, Agent, or Firm* — BAYES PLLC

(57) ABSTRACT

Disclosed are a method for transmitting a signal, a terminal device and a network device. The method comprises: determining a time sequence of each synchronization signal block from among a plurality of synchronization signal blocks in a first period; and respectively receiving the plurality of synchronization signal blocks according to the time sequence of each synchronization signal block in the first period. By means of the method, the terminal device and the network device in the embodiments of the present application, the computational complexity of a terminal device can be reduced, the detection time can be reduced, and the power consumption can be saved on.

16 Claims, 5 Drawing Sheets

(51) Int. Cl.
    *H04W 76/27*      (2018.01)
    *H04W 72/0446*      (2023.01)
    *H04W 52/02*      (2009.01)
    *H04J 11/00*      (2006.01)

(52) U.S. Cl.
    CPC ......... *H04W 56/001* (2013.01); *H04W 72/23* (2023.01); *H04W 76/27* (2018.02); *H04W 72/0446* (2013.01)

(56) References Cited

U.S. PATENT DOCUMENTS

| | | | |
|---|---|---|---|
| 9,025,650 | B2 | 5/2015 | Lo et al. |
| 2010/0260156 | A1 | 10/2010 | Lee |
| 2013/0202019 | A1 | 8/2013 | Lo |
| 2014/0029656 | A1 | 1/2014 | Lo et al. |
| 2015/0244554 | A1 | 8/2015 | Lo et al. |
| 2015/0304079 | A1 | 10/2015 | Kim et al. |
| 2016/0007307 | A1 | 1/2016 | Wei et al. |
| 2016/0316431 | A1 | 10/2016 | Zhu et al. |
| 2017/0325184 | A1* | 11/2017 | Kwan ................... H04L 1/1887 |
| 2018/0054788 | A1* | 2/2018 | Kwon ................... H04L 27/261 |
| 2018/0084593 | A1* | 3/2018 | Chen ..................... H04L 5/0048 |
| 2018/0109345 | A1* | 4/2018 | Svedman ............ H04W 72/042 |
| 2018/0176067 | A1* | 6/2018 | Luo ..................... H04L 27/2678 |
| 2018/0184391 | A1* | 6/2018 | Ly ....................... H04L 27/2657 |
| 2018/0192384 | A1* | 7/2018 | Chou ................. H04W 72/044 |
| 2018/0198659 | A1* | 7/2018 | Ko .......................... H04L 5/005 |
| 2018/0213493 | A1* | 7/2018 | Chakraborty ......... H04L 5/0032 |
| 2018/0227867 | A1* | 8/2018 | Park ..................... H04W 56/001 |
| 2018/0227935 | A1* | 8/2018 | Zhou ................. H04W 72/1289 |
| 2018/0248642 | A1* | 8/2018 | Si .......................... H04L 5/0092 |
| 2019/0140801 | A1* | 5/2019 | Ko .......................... H04L 5/0044 |
| 2019/0173719 | A1* | 6/2019 | Qin ..................... H04J 11/0076 |
| 2019/0174436 | A1* | 6/2019 | da Silva ................. H04L 5/005 |
| 2019/0182782 | A1* | 6/2019 | Wang ............... H04W 56/0015 |
| 2019/0200306 | A1* | 6/2019 | Ko ...................... H04J 11/0069 |
| 2019/0268056 | A1* | 8/2019 | Wang ....................... H04B 7/06 |
| 2019/0297560 | A1* | 9/2019 | Gao .................... H04W 72/044 |
| 2019/0319699 | A1* | 10/2019 | Lee ..................... H04L 27/2666 |
| 2019/0349108 | A1* | 11/2019 | Takeda ................ H04J 11/0079 |
| 2019/0373570 | A1* | 12/2019 | Yokomakura ......... H04W 16/28 |
| 2019/0393972 | A1* | 12/2019 | Pan ..................... H04J 11/0073 |
| 2020/0015197 | A1 | 1/2020 | Harada et al. |
| 2020/0245228 | A1* | 7/2020 | Rune ......................... H04L 1/08 |

FOREIGN PATENT DOCUMENTS

| | | |
|---|---|---|
| CN | 102461269 A | 5/2012 |
| CN | 104955106 A | 9/2015 |
| CN | 105052178 A | 11/2015 |
| CN | 105682214 A | 6/2016 |
| CN | 105703869 A | 6/2016 |
| CN | 106455040 A | 2/2017 |
| EP | 0906621 A2 | 4/1999 |
| EP | 3079385 A1 | 10/2016 |
| RU | 2409896 C2 | 1/2011 |
| WO | 0072600 A2 | 11/2000 |
| WO | 2010071233 A1 | 6/2010 |
| WO | 2018123468 A1 | 7/2018 |

OTHER PUBLICATIONS

Supplementary European Search Report in the European application No. 17900576.4, dated Jan. 30, 2020.
Supplementary European Search Report in the European application No. 17900440.3, dated Feb. 12, 2020.
English translation of the Written Opinion of the International Search Authority in the international application No. PCT/CN2017/076856, dated Dec. 5, 2017.
English translation of the Written Opinion of the International Search Authority in the international application No. PCT/CN2017/083245, dated Nov. 7, 2017.
International Search Report in the international application No. PCT/CN2017/083245, dated Nov. 7, 2017.
Written Opinion of the International Search Authority in the international application No. PCT/CN2017/083245, dated Nov. 7, 2017 and English translation provided by Google Translate.
International Search Report in the international application No. PCT/CN2017/076856, dated Dec. 5, 2017.
Written Opinion of the International Search Authority in the international application No. PCT/CN2017/076856, dated Dec. 5, 2017 and English translation provided by Google Translate.
Guangdong OPPO Mobile Telecom, Discussion on multi-beam based initial access for NR, Discussion and Decision, 3GPP TSG RAN WG1 Meeting #87, R1-1611701, Nov. 14-18, 2016.
Qualcomm Incorporated, Multi-beam SYNC design, Discussion, 3GPP TSG RAN WG1 Meeting #87 R1-1612024, Nov. 14-18, 2016.
Notice of Allowance of the Russian application No. 2019132693, dated Jul. 28, 2020.
First Office Action of the Chilean application No. 201902618, dated Aug. 27, 2020.
Intel Corporation, on NR initial access and mobility, Discussion and Decision, 3GPP TSG RAN WG1 Meeting #87 R1-1611969, Nov. 14-18, 2016.
Ericsson, NR synchronization signal bandwidth and multiplexing, Discussion, Decision, 3GPP TSG-RAN WG1 NR adhoc R1-1700292, Jan. 16-20, 2017.
Guangdong OPPO Mobile Telecom: "Discussion on SS block related design for NR", 3GPP Draft; R1-1701937, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017 (Feb. 12, 2017), XP051209099.
First Office Action of the European application No. 17900440.3, dated Oct. 7, 2020.
Non-Final Office Action of the U.S. Appl. No. 16/494,258, dated Oct. 28, 2020.
First Office Action of the European application No. 17900576.4, dated Nov. 6, 2020.
Office Action of the Indian application No. 201917039182, dated Dec. 14, 2020.
First Office Action of the Canadian application No. 3056265, dated Oct. 22, 2020.
ITL; "On NR-SS structure and time indexing", 3GPP Draft; R1-1703422, 3GPP, Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, section 2.1.
First Office Action of the Chinese application No. 201911308537.3, dated Nov. 2, 2020.
Samsung, SS burst set composition and time index indication[online], 3GPP TSG RAN WG1#88 R1-1702901, Feb. 17, 2017.
ZTE, ZTE Microelectronics, Design of SS burst set and SS block index[online], 3GPP TSG RAN WG1#88 R1-1701573, Feb. 17, 2017.
Motorola Mobility, Lenovo, Numerology and structure for NR synchronization signal[online], 3GPP TSG RAN WG1#88R1-1703043, Feb. 17, 2017.
Guangdong OPPO Mobile Telecom, Discussion on design of SS block[online], 3GPP TSG RAN WG1#89 R1-1707691. Internet<URL:http://www.3gpp.org/ftp/tsg_ran/WG1_RL1/TSGR1_89/Docs/R1-1707691.zip>, May 6, 2017.
Second Office Action of the Chile application No. 201902618, dated Feb. 1, 2021.
Office Action of the Indian application No. 201917041390, dated Feb. 24, 2021.
First Office Action of the Japanese application No. 2019-550631, dated Mar. 16, 2021.
Second Office Action of the European application No. 17900440.3, dated Mar. 24, 2021.
Notice of Allowance of the U.S. Appl. No. 16/494,258, dated Mar. 3, 2021.
3GPP TSG-RAN WG1 Meeting #88 R1-1703092, Athens, Greece Feb. 13-17, 2017, Agenda item: 8.1.1.1.2; Source: Nokia, Alcatel-

(56) References Cited

OTHER PUBLICATIONS

Lucent Shanghai Bell; Title: On Requirements and Design of SS Burst Set and SS Block Index Indication, entire document.
3GPP TSG RAN WG1 Meeting #88 R1-1703353, Athens, Greece, Feb. 13-17, 2017, Agenda Item: 8.1.1.1.2; Source: Huawei, HiSilicon; Title: Discussion on SS burst set composition and SS block time index indication, entire document.
First Office Action of the Chinese application No. 201911308816.X, dated Apr. 28, 2021.
Qualcomm Incorporated, SS burst composition and time index indication considerations, 3GPP TSG RAN WG1 #88 R1-1702585, Feb. 7, 2017, entire document.
NTT DoCoMo, Inc., Discussion on SS burst set composition and SS block index indication for NR, 3GPP TSG RAN WG1 #88 R1-1702823, Feb. 7, 2017, entire document.
CATT, SS Burst Set and SS Block Configuration, 3GPP TSG RAN WG1 #88 R1-1702058, Feb. 7, 2017, entire document.
First Office Action of the Japanese application No. 2019-549509, dated May 21, 2021.
First Office Action of the Korean application No. 10-2019-7030102, dated May 29, 2021.
Notice of Allowance of the European application No. 17900576.4, dated Jun. 7, 2021.
First Office Action of the Taiwanese application No. 107106891, dated May 20, 2021.
First Office Action of the Korean application No. 10-2019-7027896, dated Jul. 22, 2021.
First Office Action of the Australian application No. 2017403652, dated Nov. 8, 2021.
First Office Action of the Indonesian application No. P00201909141, dated Nov. 8, 2021.
Notice of Rejection of the Japanese application No. 2019-549509, dated Dec. 24, 2021.
Supplementary European Search Report in the European application No. 21195571.1. dated Jan. 7, 2022.
Notice of Allowance of the Australian application No. 2017403652, dated Jan. 20, 2022.
First Office Action of the Israeli application No. 269319, dated Jan. 19, 2022.
InterDigital Communications"Considerations on SS Burst Design and Indication"3GPP TSG RAN WG1 Meeting #88, R1-1702315,Athens, Greece Feb. 13-17, 2017, entire document.
Notice of Allowance of the Korean application No. 10-2019-7027896, dated Mar. 11, 2022.
First Office Action of the Malaysian Application No. PI2019005275, dated May 19, 2022.
First Office Action of the Chinese application No. 201780088484.1, dated Jul. 11, 2023, 13 pages with English translation.
First Office Action of the Chinese application No. 201780087424.8, dated Jul. 27, 2023, 14 pages with English translation.

* cited by examiner

METHOD FOR TRANSMITTING SIGNAL, TERMINAL DEVICE AND NETWORK DEVICE

CROSS-REFERENCE TO RELATED APPLICATION

The present application is the U.S. national phase application of PCT Application No. PCT/CN2017/076856 filed on Mar. 15, 2017, the disclosure of which is incorporated herein in its entirety by reference.

TECHNICAL FIELD

Embodiments of the disclosure relate to the field of communications, and more particularly to a signal transmission method, a terminal device and a network device.

BACKGROUND

A multi-beam system covers a whole cell through different beams, that is, each beam covers a relatively small range, and an effect of covering the whole cell by use of multiple beams is achieved by time sweeping. Different synchronization signal blocks (SSBs) are sent on some different beams, multiple SSBs in an SS cycle are combined into an SSB burst, and multiple SSB bursts form an SS burst set. A terminal device intended to obtain a condition of multiple beams usually has to perform detection in a whole SS cycle, which causes long detection time and high power consumption.

SUMMARY

In view of this, the embodiments of the disclosure provide a signal transmission method, a terminal device and a network device, which can reduce calculation complexity of the terminal device, detection time, and power consumption.

A first aspect provides a signal transmission method, which includes that: a timing sequence of each of multiple SSBs in a first cycle is determined; and each of the multiple SSBs is received based on the timing sequence of the respective SSB in the first cycle.

Herein, the timing sequence of the SSB may be a time-domain resource taken by the SSB, and may take time-domain unit as a unit.

In addition, the multiple SSBs may be all or part of SSBs of a cell, or may include all or part of SSBs of a neighbor cell of a present cell accessed by a terminal device.

If the multiple SSBs are different SSBs of the same cell, a time length of the first cycle may be equal to a transmission cycle of any SSB in the cell. Herein, different SSBs may mean that different beams are adopted for the SSBs, or may mean that the SSBs include different signal types or signal contents. In other words, the time length of the first cycle may also be equal to a transmission cycle of the same beam.

The terminal device may determine the timing sequences of the multiple SSBs in the cycle in advance, and then may receive the SSBs on fixed time-domain resources, so that the terminal device may greatly reduce calculation complexity, reduce detection time and reduce power consumption.

In a possible implementation mode, the method may further include receiving indication information from the network device, where the indication information indicates the number of multiple SSB to be sent, the operation of determining the timing sequence of each of the multiple SSBs in the first cycle, may include determining the timing sequence of each of the plurality of SSBs in the first cycle based on the number of the plurality of SSBs, where each of the timing sequences of the SSBs in the first cycle correspond to a respective one of the plurality of SSBs.

The number of the SSBs and the mappings of the timing sequences of the multiple SSBs may be regulated by protocol, or configured semi-statically by Radio Resource Control (RRC) signaling.

In a possible implementation mode, the method may further include receiving a first SSB from the network device, the first SSB is different with any of the multiple SSBs in their respective timing sequences in the first cycle; and the method may further include receiving indication information from the network device, the indication information indicates a number of time-domain units between any of SSBs and the first SSB burst; and the operation of determining the timing sequence of each of the multiple SSBs in the first cycle may include determining the timing sequence of each of the SSBs in the first cycle based on the timing sequence of the first SSB in the first cycle and the number of the time-domain units.

Herein, the time-domain unit may be an Orthogonal Frequency Division Multiplexing (OFDM) symbol, and may also be a slot, a mini-slot and the like.

In a possible implementation mode, the method may further include receiving indication information from the network device, where the indication information indicates the timing sequence of each of the SSBs in the first cycle; and the operation of determining the timing sequence of each of the multiple SSBs in the first cycle may include determining the timing sequence of each of the multiple SSBs in the first cycle based on the indication information.

In a possible implementation mode, the method may further include receiving the indication information from the network device, the indication information indicates a first correspondence of multiple correspondences, and each of the correspondences is a mapping of a respective one of the multiple SSBs in the first cycle and a timing sequence; and the operation of determining the timing sequence of each of multiple SSBs in the first cycle may include determining the time sequence of each of the SSBs in the first cycle based on the first correspondence.

In a possible implementation mode, the indication information may be carried in at least one of the broadcast message, the system message, the RRC signaling, media access control (MAC) control element (CE) signaling, or downlink control information (DCI).

In a possible implementation mode, the carrier in a long term evolution (LTE) system or a new radio (NR) system may be taken as a primary carrier, and the primary carrier may be used to notify the terminal device of the timing sequence of a SSB on secondary carriers of the primary carrier. In other words, indication information may be sent to the terminal device through various types of signaling on the primary carrier.

In a possible implementation mode, each of the SSBs may mainly include a Primary Synchronization Signal (PSS) and a Secondary Synchronization Signal (SSS), and some SSBs may further include a Physical Broadcast Channel (PBCH) and may even include a third type of SS.

A second aspect provides a signal transmission method, which includes that: indication information is sent to a terminal device, the indication information is used for the terminal device to determine a timing sequence of each of multiple SSBs in a first cycle; and the multiple SSBs are sent to the terminal device based on the timing sequence of each SSB in the first cycle.

The timing sequences of the multiple SSBs in the cycle are indicated to the terminal device, so that the terminal device may greatly reduce calculation complexity, reduce detection time and reduce power consumption.

In a possible implementation method, the plurality of SSBs may be different SSBs of a same cell, and a time length of the first cycle may be equal to a transmission cycle of one of the plurality of SSBs.

In a possible implementation method, the indication information may indicate a number of the plurality of SSBs to be sent, and each of the timing sequences of the plurality of SSBs in the first cycle may correspond to a respective one the plurality of SSBs.

In a possible implementation method, the indication information may indicate a number of time-domain units between any of the plurality of SSBs and the first SSB, and the first SSB is different from the any of the plurality of SSBs in their respective timing sequences in the first cycle; and the method may further include sending the first SSB to the terminal device based on the timing sequence of the first SSB in the first cycle.

In a possible implementation method, the indication information may indicate the timing sequence of each of the plurality of SSBs in the first cycle.

In a possible implementation method, the indication information may indicate a first correspondence of a plurality of correspondences, and each of the plurality of correspondences may be a mapping of a timing sequence of a respective one of the plurality of SSBs in the first cycle.

In a possible implementation method, the indication information may be carried in at least one of a broadcast message, a system message, RRC signaling, media access control (MAC) control element (CE) signaling, or downlink control information (DCI).

In a possible implementation method, the operation of sending indication information to the terminal device may include sending the indication information to the terminal device on a primary carrier.

In a possible implementation method, the primary carrier may be a carrier in a New Radio (NR) system or a Long Term Evolution (LTE) system.

In a possible implementation mode, each of the SSBs may at least include a PSS and an SSS.

A third aspect provides a terminal device, which is configured to execute the method in the first aspect or any possible implementation mode of the first aspect. Specifically, the terminal device includes units configured to execute the method in the first aspect or any possible implementation mode of the first aspect.

A fourth aspect provides a network device, which is configured to execute the method in the first aspect or any possible implementation mode of the second aspect. Specifically, the network device includes units configured to execute the method in the second aspect or any possible implementation mode of the second aspect.

A fifth aspect provides a terminal device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the first aspect or any possible implementation mode of the first aspect.

A sixth aspect provides a network device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the second aspect or any possible implementation mode of the second aspect.

A seventh aspect provides a computer storage medium, which is configured to store a computer software instruction for executing the method in the first aspect or any possible implementation mode of the first aspect, or the method in the second aspect or any possible implementation mode of the second aspect, the instruction including a program designed to execute the aspects.

These aspects or other aspects of the application will become clearer and easier to understand through the following descriptions about the embodiments.

DETAILED DESCRIPTION

Figure 1:
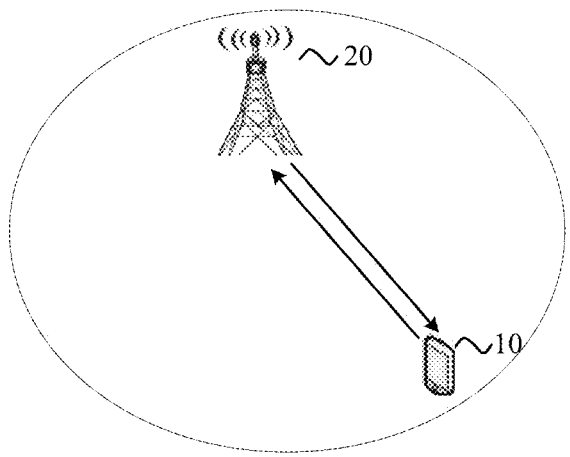
FIG. 1 illustrates a schematic diagram of an application scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, NR or a future 5th-Generation (5G) system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, OFDM, Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may be a user equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, UE in a future 5G network, UE in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like. There are no limits made in the embodiments of the disclosure.

FIG. 1 illustrates a schematic diagram of an application scenario according to an embodiment of the disclosure. A communication system in FIG. 1 may include a terminal device 10 and a network device 20. The network device 20 is configured to provide a communication service for the terminal device 10 for access to a core network. The terminal device 10 searches a synchronization signal, a broadcast signal and the like from the network device 20 to access the network, thereby communicating with the network. Arrows illustrated in FIG. 1 may represent uplink/downlink transmission implemented through a cellular link between the terminal device 10 and the network device 20.

In an LTE system, a terminal device needs to implement a cell search process during initial access or when the terminal device needs to measure a neighbor cell. The terminal device performs cell search to acquire a physical ID(s) of the cell(s), and to acquire timing synchronization and frequency synchronization information of the system. This process is unrelated to system bandwidth, and the terminal device may directly perform detection and acquisition. Different cells are distinguished in a physical layer with their respective PCIs. There are totally 504 PCIs, which are classified into 168 groups (recorded as N(1)_ID and ranging from 0 to 167), and each group includes three different intra-group IDs (recorded as N(2)_ID and ranging from 0 to 2). Therefore, a PCI (recorded as Ncell_ID) may be calculated by using the following formula:

$$PCI=N_{ID}^{cell}=3N_{ID}^{(1)}+N_{ID}^{(2)}$$

A PSS is configured to send a value of an intra-group ID, i.e., N(2)_ID, and an SSS is configured to send a value of a group ID, i.e., N(1)_ID. For an FDD system, PSSs periodically appear on the last OFDM symbol of each of slot 0 and slot 10, and SSSs periodically appear on the second last symbol of each of slot 0 and slot 10. For a TDD system, PSSs periodically appear on the third OFDM symbol of each of subframes 1 and 6, and SSSs periodically appear on the last symbol of each of subframes 0 and 5.

In an NR communication system, designs of a multi-antenna array, beamforming and the like are introduced. For example, a previous cell is updated to be covered with multiple beams, the beam gain may compensate for, to a certain extent, coverage reduction brought by use of a high frequency band, and may reduce mutual interference and enhance system performance.

Figure 2:
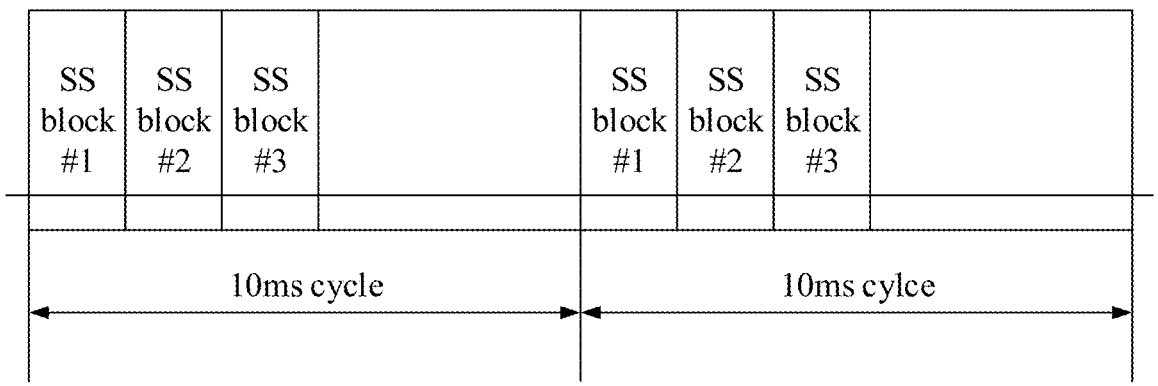
FIG. 2 illustrates a configuration diagram of timing sequences of an SSB burst in an SS cycle.
Figure 2:
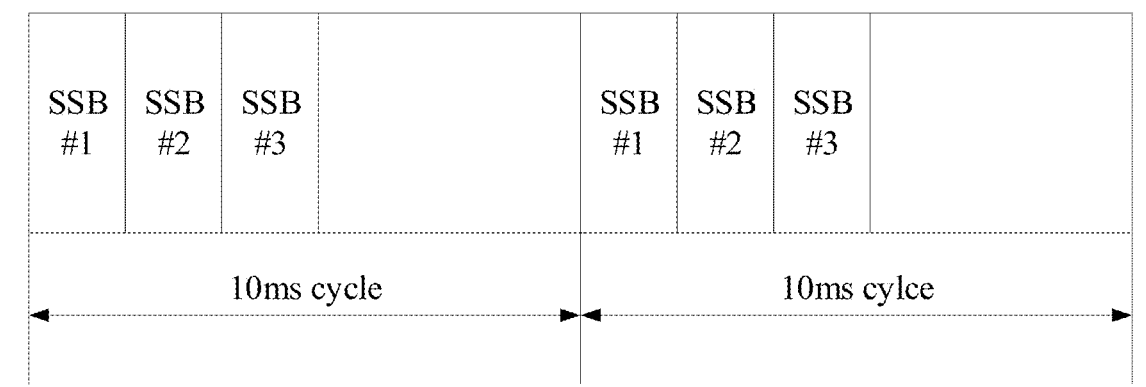
Figure 3:
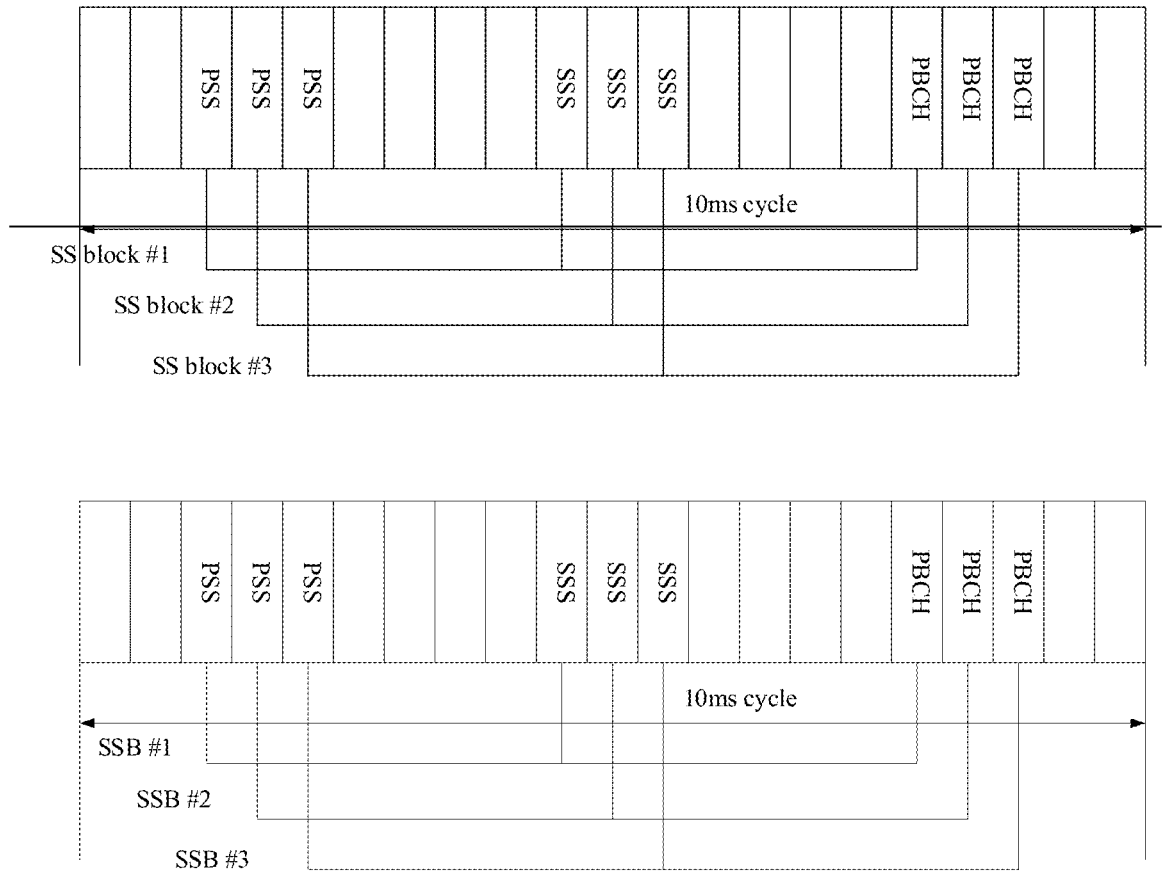
FIG. 3 illustrates another configuration diagram of a timing sequence of an SSB burst in an SS cycle.

SSBs are introduced into the NR system, and mainly include PSSs and SSSs. Some SSBs may further include PBCH and may even include a third type of SSs. There are no limits made to types of signals included in an SSB in the embodiments of the disclosure. In the NR system, a length of an SS may be increased, for example, to 127; or, the SS may be repeated in frequency domain, thus causing a synchronization bandwidth to be increased by integer times. The SSB is taken as a minimum unit of an SS, and multiple SSBs form an SS burst, multiple SS burst form an SS burst set, and it is also possible to map in the form of Time Division Multiple (TDM) within the SSB. As illustrated in FIG. 2. An SS cycle, i.e., a cycle of an SS burst, is 10 ms. Herein, the cycle of the SS burst may be considered as a transmission cycle of the same SSB in the same cell, three beams may be adopted to send SSB #1, SSB #2 and SSB #3. The SSBs may have no spacing, as illustrated in FIG. 2, or may be spaced by certain time-domain units. In a cycle of an SS burst, signals of different SSBs may be overlapped in time, as illustrated in the timing sequence diagram of FIG. 3.

Figure 4:
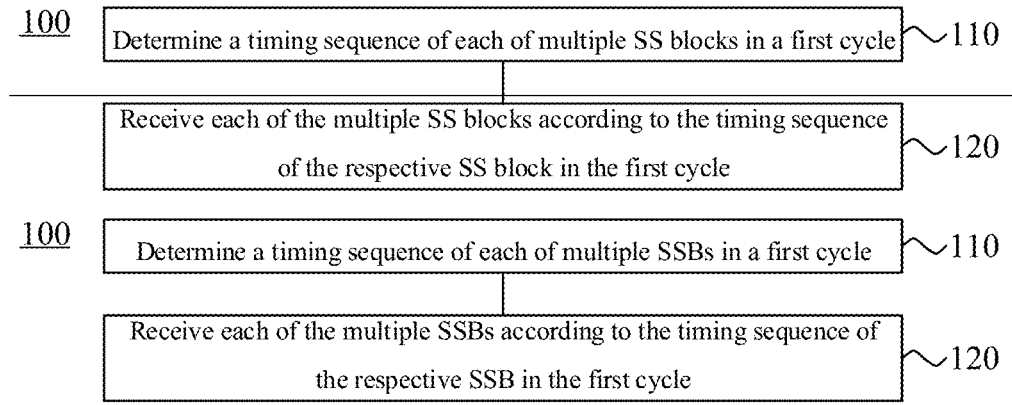
FIG. 4 illustrates a schematic block diagram of a signal transmission method according to an embodiment of the disclosure.

FIG. 4 illustrates a schematic block diagram of a signal transmission method 100 according to an embodiment of the disclosure. As illustrated in FIG. 4, the method 100 may be executed by a terminal device, and may specifically be executed by a UE. The method 100 includes the following actions.

In S110, a timing sequence of each of multiple SSBs in a first cycle is determined.

In S120, each of the multiple SSBs is received based on the timing sequence of the SSB in the first cycle.

First of all, it is to be noted that the timing sequence of the SSB means a time-domain resource used by the SSB, and may take time-domain unit as a unit. For example, a resource in the first cycle includes seven OFDM symbols in time domain, and if a network device sends three SSBs to the terminal device, and the network device informs the terminal device of the specific OFDM symbols where the three SSBs are located in the first cycle in a certain manner, the terminal device may directly receive the three SSBs on the OFDM symbols informed by the network device.

Alternatively, a time length of the first cycle may be equal to a transmission cycle of the multiple SSBs.

It is to be understood that the length of the cycle in the embodiment of the disclosure may be similar to a cycle of an SS in the prior art, or may be a transmission cycle of any SSB of the same cell, or may be a transmission cycle of a same beam sending a SSB of the same cell. It may specifically be a cycle of 10 ms illustrated in FIG. 2 or FIG. 3. Herein, when types of signals in an SSB are the same as those of another SSB, and contents of the signals in the former SSB are the same as those of the latter SSB, the SSBs are the same SSB. If two SSBs include different signal types or include the same signal types but incompletely the same signal contents, or different beams are adopted for the two SSBs, the two SSBs are different from each other. For example, SSB #1 includes a PSS and an SSS, N(2)_ID sent in the PSS is 0, N(2)_ID sent in the SSS is 10, and beam 1 is adopted; SSB #2 also includes a PSS and an SSS, but N(2)_ID sent in the PSS is 0, N(2)_ID sent in the SSS is 10, and beam 2 is adopted, or SSB #2 includes the PSS, the SSS and a PBCH; and therefore, SSB #1 and SSB #2 are different.

It is also to be understood that the terminal device may further determine that a certain time-domain resource in a cycle is configured to receive multiple SSBs, and then the terminal device may detect the multiple SSBs on this time-domain resource. For example, if the network device sends five SSBs to the terminal device in a cycle, the terminal device may determine to receive the SSBs on a second time-domain unit to a sixth time-domain unit in the cycle, but may merely detect the five SSBs on the second time-domain unit to a fourth time-domain unit. That is, the terminal device does not have to determine the specific resource on which each SSB is sent, and merely needs to know a general position.

Therefore, based on the signal transmission method of the embodiment of the disclosure, the terminal device may determine the timing sequences of the multiple SSBs in the cycle in advance, and then may receive the SSBs on fixed time-domain resources, so that the terminal device can greatly reduce calculation complexity, reduce detection time and reduce power consumption.

Alternatively, in the embodiment of the disclosure, the method further includes receiving the indication information from the network device, the indication information indicates a number of the multiple SSBs to be sent. The operation of determining the timing sequence of each of the multiple SSBs in the first cycle may include determining the timing sequence of each of the multiple SSBs in the first cycle based on the number of the multiple SSBs, where each of the timing sequences of the SSBs in the first cycle corresponds to a respective one of the multiple SSBs.

Furthermore, the network device may configure multiple correspondences for the terminal device and send the multiple correspondences to the terminal device. The network device may send indication information to the terminal device, where the indication information indicates the number of multiple SSBs to be sent. The terminal device may determine the first correspondence from the multiple correspondences according to the number indicated by the indication information, and determine the timing sequence of each SSB in the first cycle according to the first correspondence.

Specifically, the network device may configure a relationship between the number of SSBs to be sent to the terminal device and timing sequences of these SSBs in an SS burst cycle in advance. For example, the network device may configure three SSBs to be sent on first three time-domain units of an SS burst cycle respectively. Or the network device may configure five SSBs to be sent on first, third, fifth, seventh and ninth time-domain units of an SS burst cycle respectively. Or the network device may further configure timing sequences of the three SSBs and timing sequences of the five SSBs at the same time. In a word, in such an indication manner, a timing sequence of an SSB is usually configured statically or semi-statically.

Alternatively, in the embodiment of the disclosure, the method further includes receiving the first SSB from the network device, the timing sequence of first SSB is different with any of the multiple SSBs in the first cycle. The method further includes receiving the indication information from the network device, the indication information indicates a number of time-domain units between the any of the SSBs and the first SSB. The operation of determining the timing sequence of each of the multiple SSBs in the first cycle may include determining the timing sequence of each of the multiple SSBs in the first cycle according to the timing sequence of the first SSB in the first cycle and the number of the time-domain units.

Alternatively, the network device may further send the indication information to the terminal device in advance, the indication information indicates the number of the time-domain units between the two adjacent SSBs in the multiple SSBs. If the terminal device detects a timing sequence of one of the SSBs, the terminal device may determine possible timing sequences of the other SSBs based on the number of the time-domain units, indicated in the indication information, between the two adjacent SSBs in the multiple SSBs.

Furthermore, if the number of the time-domain units between any two SSBs is the same, the indication information sent to the terminal device by the network device may only indicate the number of spacings, and if the network device also informs the terminal device of the number of the SSBs to be sent, the terminal device may determine the possible timing sequence of the SSBs to be sent by the network device. No matter whether the number of the time-domain units between any two SSBs is the same or not, the indication information sent to the terminal device by the network device may indicate multiple spacings, and the terminal device may determine the possible timing sequences of the SSBs to be sent by the network device even if the network device does not inform the terminal device of the number of the SSBs to be sent.

For example, if the network device intends to send five SSBs to the terminal device and the network device prepares to perform transmission on first, third, fifth, seventh and ninth time-domain units in an SS burst cycle, the network device may inform the terminal device that every two SSBs are spaced by one time-domain unit. When the terminal device detects one SSB, for example, the SSB on the third time-domain unit, the terminal device may sequentially detect SSBs on the other odd time-domain units in the SS burst cycle. The network device may also inform the terminal device of the total number of the SSBs at the same time of informing the terminal device that the two adjacent SSBs are equally spaced and of the number of the spacing time-domain units. For another example, the number of the time-domain units between any two SSBs may also be unequal. Then, the network device may inform the terminal device of the spacing number (K−1), K is the number of SSBs. The terminal device, after detecting one SSB, may determine the time-domain resource positions of the other SSBs in the SS burst cycle based on the spacing number (K−1). Or, the network device may further inform the terminal device of the time-domain resource position of the first SSB in the SS burst cycle, and then the terminal device may determine the positions of the other SSBs directly based on the spacing between every two SSBs in the multiple SSBs and the position of the first SSB.

Alternatively, in the embodiment of the disclosure, the method further includes receiving the indication information from the network device. The indication information indicates the timing sequence of each SSBs in first cycle. The operation of determining the timing sequence of each of the multiple SSBs in the first cycle may include determining the time sequence of each of the multiple SSBs in the first cycle based on the indication information.

Specifically, the network device may further dynamically indicate the specific position of each of the multiple SSBs, to be sent to the terminal device, in an SS burst cycle to the terminal device. For example, the network device may directly indicate the terminal device that three SSBs to be sent are configured on first three time-domain units of an SS burst cycle. Then, the terminal device, after receiving the indication information, may directly detect the three SSBs on the first three time-domain units of the SS burst cycle.

Alternatively, in the embodiment of the disclosure, the method further includes receiving indication information from the network device, the indication information indicates a first correspondence in multiple correspondences, and the correspondences are mappings of timing sequences of the SSBs in the first cycle. The operation of determining the timing sequence of each of the multiple SSBs in the first cycle includes determining the timing sequence of each of the multiple SSBs in the first cycle based on the first correspondence.

Specifically, the network device may fix the time-domain position of the multiple SSBs in the SS burst cycle in advance, and may configure the multiple correspondences in advance. For example, the network device configures five SSBs to be sent to the terminal device in advance, and fixes time-domain resources configured to send the five SSBs in the SS burst cycle. For example, the five SSBs may be fixed on first five time-domain units in the SS burst cycle. The network device may also fix the five SSBs on second, third, fifth, seventh and eighth time-domain units in the SS burst cycle. The network device may store the two configuration relationships and send the two configuration relationships to the terminal device. When the network device is prepared to send the five SSBs to the terminal device, a piece of indication information may be sent to the terminal device at first to indicate one configuration relationship, and then the terminal device, after receiving the indication information, may know the specific configuration relationship and then adopt the configuration relationship indicated in the indication information to receive the SSBs from the network device. For example, 1-bit indication information may be adopted to indicate the configuration relationship, the first configuration relationship may be represented with 0, and the second configuration relationship may be represented with 1.

It is to be understood that each indication manner is schematically described and the network device may further combine each indication manner to enable the terminal device to determine the time-domain positions of the multiple SSBs in the SS burst cycle.

Alternatively, in the embodiment of the disclosure, the indication information may be carried in at least one of a broadcast message, a system message, RRC signaling, MAC CE signaling and DCI signaling.

Specifically, under the condition that the terminal device does not establish a network connection with the network device, each piece of indication information may be sent through the broadcast message or system message of the cell. After the terminal device establishes an RRC connection with the network device, the network device may send each piece of indication information based on a specification or a requirement through the RRC signaling, the MAC CE signaling or the DCI signaling. The time-domain position of the SSB in the SS burst cycle may be specified in the protocol, or may be configured statically or semi-statically by the network device.

Alternatively, in the embodiment of the disclosure, the operation that the indication information from the network device is received includes that: the indication information from the network device is received on a primary carrier.

A carrier in an LTE system or an NR system may serve as a primary carrier, and a timing sequence of an SSB in a secondary carrier in a cycle may be notified to the terminal device through the primary carrier. In other words, the indication information may be sent to the terminal device on the primary carrier through each of the abovementioned signaling.

It is to be noted that multiple SSBs sent to the terminal device by the network device may be all SSBs, configured by the network device, in a cell, or may be part of the SSBs. In the embodiment of the disclosure, the terminal device pays attention to the number of the SSBs from the network device rather than the number of the SSBs configured in the cell. The multiple SSBs sent to the terminal device by the network device may further include part or all of SSBs of a neighbor cell of the serving cell of the terminal device.

Alternatively, in the embodiment of the disclosure, different SSBs may be sent by different beams, and the network device may send SSBs corresponding to beams around a beam adopted for the system message or the broadcast message to the terminal device. For example, in FIG. 2, beam 1 is adopted for SSB #1, beam 2 is adopted for SSB #2 and beam 3 is adopted for SSB #3. If the network device adopts beam 2 to send the broadcast message or the system message at the time-domain position of the SSB #2 in FIG. 2, the network device may notify the time-domain position of SSB #3 to the terminal device, and the terminal device may directly receive the SSB at the indicated time-domain position.

It is also to be understood that the time-domain positions of various SSBs configured by the network device in advance may be time-domain positions of each SSB in the largest number of SSBs, configured by the network device, in the cell. If the network device sends part of the SSBs to the terminal device, the terminal device still performs detection at the configured time-domain positions. For example, the largest number of the SSBs in the cell is 4, and the network device configures each SSB in the four SSBs to correspond to each time-domain unit in first four time-domain units in the SS burst cycle. If the network device sends three SSBs to the terminal device, the terminal device still performs detection on the first four time-domain units, and the terminal device may detect the three SSBs on the first three time-domain units and detect nothing on the last time-domain unit. Or the terminal device may also detect the SSBs on the last three time-domain units and detect nothing on the first time-domain unit. The embodiment of the disclosure is not limited thereto.

It is also to be understood that the time-domain unit in the embodiment of the disclosure may be an OFDM symbol, or may be a slot, a mini-slot and the like.

Figure 5:
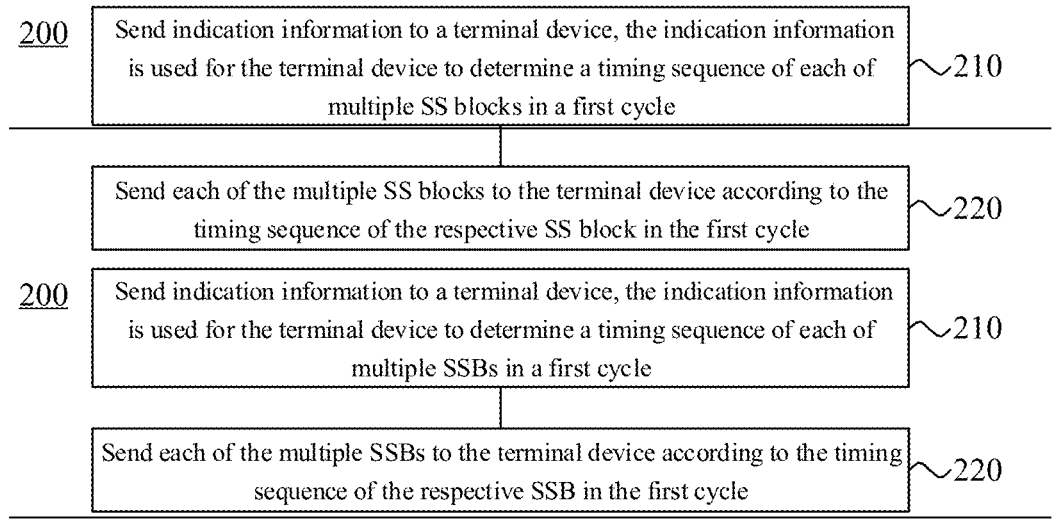
FIG. 5 illustrates another schematic block diagram of a signal transmission method according to an embodiment of the disclosure.

FIG. 5 illustrates a schematic block diagram of a signal transmission method 200 according to an embodiment of the disclosure. As illustrated in FIG. 5, the method 200 may be executed by a network device and may specifically be executed by a base station. The method 200 includes the following actions.

In S210, indication information is sent to a terminal device. The indication information is used for the terminal device to determine a timing sequence of each of multiple SSBs in a first cycle.

In S220, each of the multiple SSBs are sent to the terminal device based on the timing sequence of the respective SSB in the first cycle.

In such a manner, based on the signal transmission method of the embodiment of the disclosure, the timing sequences of the multiple SSBs in the cycle are indicated to the terminal device, so that the terminal device may greatly reduce calculation complexity, reduce detection time and reduce power consumption.

Alternatively, in the embodiment of the disclosure, the multiple SSBs are different SSBs of the same cell, and a time length of the first cycle is equal to a transmission cycle of the multiple SSBs.

Alternatively, in the embodiment of the disclosure, the indication information indicates the number of multiple SSBs to be sent. The number of multiple SSBs corresponds to the timing sequences of the multiple SSBs in the first cycle.

Alternatively, in the embodiment of the disclosure, the indication information indicates the number of time-domain units between any of the multiple SSBs Sk and first SSB. The first SSB is different from any SSB in their respective timing sequences in the first cycle, and the method further includes sending the first SSB to the terminal device, based on the timing sequence of the first SSB in the first cycle.

Alternatively, in the embodiment of the disclosure, the indication information indicates the timing sequence of each of the SSBs in the first cycle.

Alternatively, in the embodiment of the disclosure, the indication information indicates a first correspondence in multiple correspondences, and the correspondences are mappings of timing sequences of the SSBs in the first cycle.

Alternatively, in the embodiment of the disclosure, the indication information is carried in at least one of the broadcast message, the system message, the RRC signaling, MAC CE signaling, or DCI.

Alternatively, in the embodiment of the disclosure, the operation of sending the indication information to the terminal device includes sending the indication information to the terminal device on a primary carrier.

Alternatively, in the embodiment of the disclosure, the primary carrier is a carrier in an NR system or a LTE system.

Alternatively, in the embodiment of the disclosure, different SSBs in the multiple SSBs are sent by using different beams.

Alternatively, in the embodiment of the disclosure, each of the SSBs at least includes a PSS and an SSS It is to be understood that interaction between the network device and the terminal device and related properties, functions and the like described from the network device correspond to related properties and functions of the terminal device. That is, if the terminal device sends information to the network device, the network device may correspondingly receive the information. For simplicity, no more elaborations will be made herein.

It is also to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Figure 6:
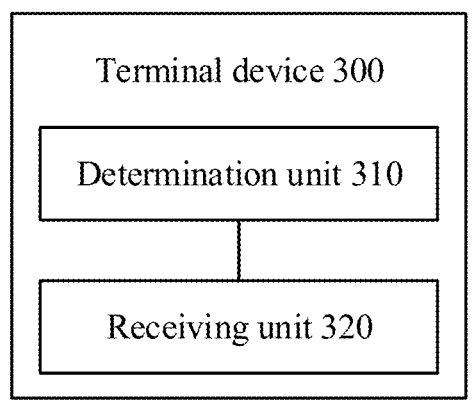
FIG. 6 illustrates a schematic block diagram of a terminal device for signal transmission according to an embodiment of the disclosure.

FIG. 6 illustrates a schematic block diagram of a signal transmission terminal device 300 according to an embodiment of the disclosure. As illustrated in FIG. 6, the terminal device 300 includes a determination unit 310 and a first receiving unit 320.

The determination unit 310 is configured to determine a timing sequence of each of multiple SSBs in a first cycle.

The first receiving unit 320 is configured to receive the multiple SSBs based on the timing sequence of each SSB in the first cycle respectively.

In such a manner, the signal transmission terminal device of the embodiment of the disclosure determines the timing sequences of the multiple SSBs in the cycle in advance and then may receive the SSBs on fixed time-domain resources, so that the terminal device may greatly reduce calculation complexity, reduce detection time and reduce power consumption.

Alternatively, in the embodiment of the disclosure, the multiple SSB are different SSBs of the same cell, and the time length of the first cycle is equal to the transmission cycle of each of the multiple SSBs.

Alternatively, in the embodiment of the disclosure, the terminal device 300 further includes a second receiving unit 330, configured to receive indication information from the network device, where the indication information indicates a number of the plurality of SSBs to be sent. The determining unit 310 is specifically configured to determine the timing sequence of each of the plurality of SSBs in the first cycle based on the number of the plurality of SSBs, where each of the timing sequences of the SSBs in the first cycle corresponds to a respective one of the plurality of SSBs.

Alternatively, in the embodiment of the disclosure, the first receiving unit 320 is further configured to receive a first SSB from the network device, where the first SSB is different from any of the multiple SSBs in their timing sequences in the first cycle. The second receiving unit 330 is configured to receive indication information from the network device, where the indication message indicates the number of time-domain units between any of the SSBs and the first SSB. The determination unit is specifically configured to determine the timing sequence of each of the SSBs in the first cycle based on the timing sequence of the first SSB in the first cycle and the number of the time-domain units.

Alternatively, in the embodiment of the disclosure, the terminal device 300 further includes a second receiving unit 330, configured to receive indication information from the network device, where the indication information indicates the timing sequence of each of the SSBs in the first cycle. The determination unit 310 is specifically configured to determine the timing sequence of each of the SSBs in the first cycle.

Alternatively, in the embodiment of the disclosure, the terminal device 300 further includes a second receiving unit 330, configured to receive indication information from the network device, where the indication information indicates a first correspondence of the multiple correspondences, where each of the correspondences is a mapping of the timing sequence of a respective one of the SSBs in the first cycle. The determining unit 310 is specifically configured to determine the timing sequence of each of the SSBs in the first cycle based on the first correspondence.

Alternatively, in the embodiment of the disclosure, the indication information is carried in at least one of the broadcast message, the system message, the RRC signaling, MAC CE signaling, or DCI.

Alternatively, in the embodiment of the disclosure, the second receiving unit 330 is specifically configured to receive the indication information from the network device on a primary carrier.

Alternatively, in the embodiment of the disclosure, the primary carrier is a carrier in an NR system or a LTE system.

Alternatively, in the embodiment of the disclosure, each of the SSBs at least includes a PSS and an SSS.

It is to be understood that the terminal device 300 for signal transmission according to the embodiment of the disclosure may correspond to the terminal device in the method of the application and the abovementioned and other operations and/or functions of each unit in the terminal device 300 are adopted to implement the corresponding flows executed by the terminal device in the method in FIG. 4 respectively and will not be elaborated herein for simplicity.

Figure 7:
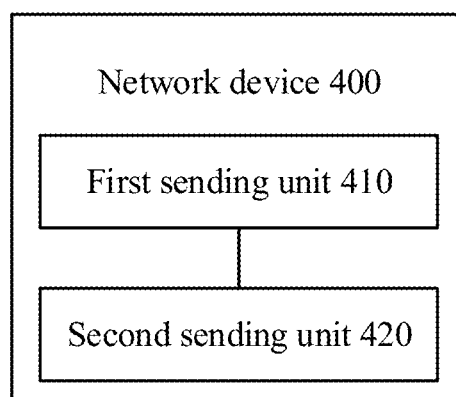
FIG. 7 illustrates a schematic block diagram of a network device for signal transmission according to an embodiment of the disclosure.

FIG. 7 illustrates a schematic block diagram of a network device 400 for signal transmission according to an embodiment of the disclosure. As illustrated in FIG. 7, the network device 400 includes a first sending unit 410 and a second sending unit 420.

The first sending unit 410 is configured to send indication information to a terminal device. The indication information is used for the terminal device to determine a timing sequence of each of multiple SSBs in a first cycle.

The second sending unit 420 is configured to send each of the multiple SSBs to the terminal device based on the timing sequence of the respective SSB in the first cycle.

In such a manner, the network device for signal transmission of the embodiment of the disclosure indicates the timing sequences of the multiple SSBs in the cycle to the terminal device, so that the terminal device can greatly reduce calculation complexity, reduce detection time and reduce power consumption.

Alternatively, in the embodiment of the disclosure, the multiple SSBs are different SSBs of the same cell, a time length of the first cycle is equal to a transmission cycle of one of the multiple SSBs in the cell.

Alternatively, in the embodiment of the disclosure, the indication information indicates the number of the multiple SSBs to be sent; the number of multiple SSBs corresponds to the timing sequences of the multiple SSBs in the first cycle.

Alternatively, in the embodiment of the disclosure, the indication message indicates the number of time-domain units between any of the multiple SSBs and the first SSB. The first SSB is different from any of the multiple SSBs in their timing sequences in the first cycle. The second sending unit 320 is configured to send the first SSB to the terminal device based on the timing sequence of the first SSB in the first cycle.

Alternatively, in the embodiment of the disclosure, the indication message indicates a timing sequence of each of the SSBs in the first cycle.

Alternatively, the indication information indicates a first correspondence of the multiple correspondences, where each of the correspondences is a mapping of the timing sequence of a respective one of the SSBs in the first cycle.

Alternatively, in the embodiment of the disclosure, the indication information is carried in at least one of the broadcast message, the system message, the RRC signaling, MAC CE signaling, or DCI.

Alternatively, in the embodiment of the disclosure, the first sending unit 410 is specifically configured to send the indication information to the terminal device on a primary carrier.

Alternatively, in the embodiment of the disclosure, the primary carrier is a carrier in an NR system or LTE system.

Alternatively, in the embodiment of the disclosure, each of the SSBs at least include a PSS and an SSS.

It is to be understood that the network device 400 for signal transmission according to the embodiment of the disclosure may correspond to the network device in the method embodiment of the disclosure, and the abovementioned and other operations and/or functions of each unit in the network device 400 are adopted to implement the corresponding flows executed by the network device in the method in FIG. 5 respectively and will not be elaborated herein for simplicity.

Figure 8:
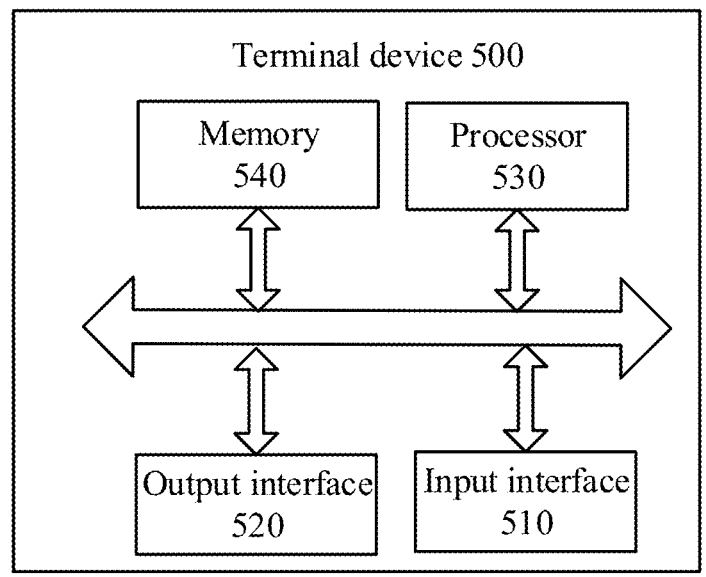
FIG. 8 illustrates another schematic block diagram of a terminal device for signal transmission according to an embodiment of the disclosure.

As illustrated in FIG. 8, an embodiment of the disclosure provides a terminal device 500 for signal transmission. The terminal device 500 may be the terminal device 300 in FIG. 6, and may be configured to execute actions of the terminal device corresponding to the method 100 in FIG. 4. The terminal device 500 includes an input interface 510, an output interface 520, a processor 530 and a memory 540. The input interface 510, the output interface 520, the processor 530 and the memory 540 may be connected through a bus system. The memory 540 is configured to store a program, instructions or a code. The processor 530 is configured to execute the program instructions or code in the memory 540 to control the input interface 510 to receive a signal, control the output interface 520 to send a signal and complete operations in the method embodiments.

In such a manner, the terminal device for signal transmission of the embodiment of the disclosure may determine the timing sequences of the multiple SSBs in the cycle in advance, and then may receive the SSBs on fixed time-domain resources, so that the terminal device can greatly reduce calculation complexity, reduce detection time and reduce power consumption.

It is to be understood that, in the embodiment of the disclosure, the processor 530 may be a Central Processing Unit (CPU), or the processor 530 may be another universal processor, a digital signal processor, an application specific integrated circuit, a field-programmable gate array or another programmable logic device, discrete gate or transistor logic device and discrete hardware component and the like. The universal processor may be a microprocessor, or the processor may be any conventional processor and the like.

The memory 540 may include a Read-Only Memory (ROM) and a Random Access Memory (RAM) and may provide instructions and data for the processor 530. A part of the memory 540 may further include a nonvolatile RAM. For example, the memory 540 may further store information of device types.

In an implementation process, actions of the method may be performed by an integrated logic circuit in a hardware form or instructions in a software form in the processor 530. The actions of the method disclosed in combination with the embodiments of the disclosure may be directly executed by a hardware processor or executed by a combination of hardware and software modules in the processor. The software module may be located in a storage medium well known in this field such as a RAM, a flash memory, a ROM, a programmable ROM or electrically erasable programmable ROM and a register. The storage medium is located in the memory 540. The processor 530 reads information in the memory 540 and completes the actions of the method in combination with hardware. No more detailed description will be made herein to avoid repetitions.

In a specific implementation mode, the first receiving unit 320 and the second receiving unit 330 in the terminal device 300 may be implemented by the input interface 510 in FIG. 8, and the determination unit 310 in the terminal device 300 may be implemented by the processor 530 in FIG. 8.

Figure 9:
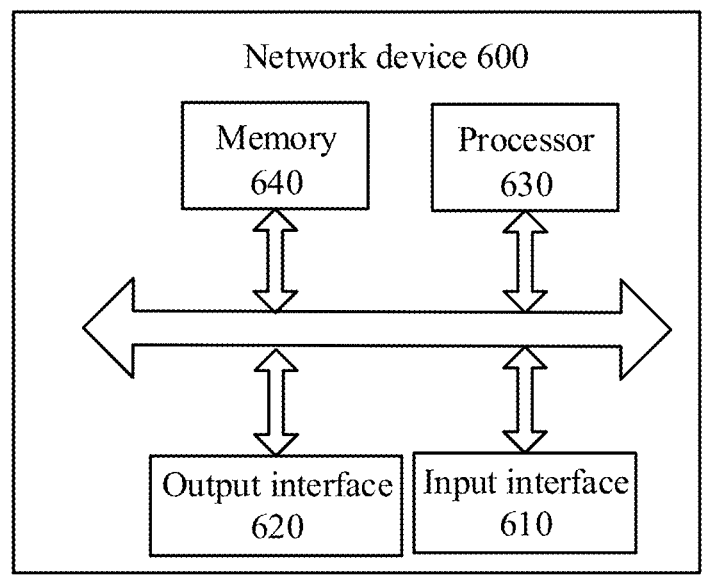
FIG. 9 illustrates another schematic block diagram of a network device for signal transmission according to an embodiment of the disclosure.

As illustrated in FIG. 9, an embodiment of the disclosure provides a network device 600 for signal transmission. The network device 600 may be the network device 400 in FIG. 7, and may be configured to execute actions of the network device corresponding to the method 200 in FIG. 5. The network device 600 includes an input interface 610, an output interface 620, a processor 630 and a memory 640. The input interface 610, the output interface 620, the processor 630 and the memory 640 may be connected through a bus system. The memory 640 is configured to store a program, instructions or a code. The processor 630 is configured to execute the program instructions or code in the memory 640 to control the input interface 610 to receive a signal, control the output interface 620 to send a signal and complete operations in the method embodiments.

In such a manner, the network device for signal transmission of the embodiment of the disclosure indicates the timing sequences of multiple SSBs in a SS burst cycle to the terminal device, so that the terminal device can greatly reduce calculation complexity, reduce detection time and reduce power consumption.

It is to be understood that, in the embodiment of the disclosure, the processor 630 may be a CPU, or the processor 630 may be another universal processor, a digital signal processor, an application specific integrated circuit, a field-programmable gate array or another programmable logic device, discrete gate or transistor logic device and discrete hardware component and the like. The universal processor may be a microprocessor, or the processor may be any conventional processor and the like.

The memory 640 may include a ROM and a RAM and provides instructions and data for the processor 630. A part of the memory 640 may further include a nonvolatile RAM. For example, the memory 640 may further store information of device types.

In an implementation process, actions of the method may be performed by an integrated logic circuit in a hardware form or instructions in a software form in the processor 630. The actions of the method disclosed in combination with the embodiments of the disclosure may be directly executed by a hardware processor or executed by a combination of hardware and software modules in the processor. The software module may be located in a storage medium well known in this field such as a RAM, a flash memory, a ROM, a programmable ROM or electrically erasable programmable ROM and a register. The storage medium is located in the memory 640. The processor 630 reads information in the memory 640 and completes the actions of the method in combination with hardware. No more detailed description will be made herein to avoid repetitions.

In a specific implementation mode, the first sending unit 410 and second sending unit 420 may be implemented by the output interface 620 in FIG. 9.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the application.

Those skilled in the art may understand that specific working processes of the system, device and unit described above may be seen from the corresponding processes in the method embodiment and will not be elaborated herein for convenience and simplicity of description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each illustrated or discussed component may be indirect coupling or communication connection, implemented through some interfaces, of the device or the units, and may be electrical and mechanical or adopt other forms.

The units described as separate parts may or may not be physically separated, and components illustrated as units may or may not be physical units, and namely may be located in a same place, or may be distributed among multiple network units. Some or all of the units may be selected based on a practical requirement, to achieve the purpose of the solutions of the embodiments.

In addition, the functional units in each of the embodiments of the disclosure may be integrated into a processing unit, or the units may physically exist independently, or two or more units may be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims

What is claimed is:

1. A signal transmission method, the method comprising:
receiving, by a terminal device, indication information from a network device, wherein the indication information is 1-bit indication information and indicates a first group of correspondences from a plurality of groups of correspondences, the plurality of groups of correspondences comprise at least two groups of pre-configured correspondences, each group is a respective group of mappings of a plurality of synchronization signal blocks (SSBs) and timing sequences of the plurality of SSBs in a first cycle, and at least one SSB of the plurality of SSBs has different timing sequences in any two groups of correspondences, and the indication information is carried in at least one of a broadcast message, a system message, RRC signaling, media access control (MAC) control element (CE) signaling, or downlink control information (DCI);

wherein the timing sequence of each of the plurality of SSBs is a time-domain resource taken by a respective one of the plurality of SSBs;

wherein each of the plurality of SSBs comprises a primary synchronization signal (PSS), a secondary synchronization signal (SSS) and a Physical Broadcast Channel (PBCH);

determining, by the terminal device, a timing sequence of each of the plurality of SSBs in the first cycle based on the received indication information; and receiving, by the terminal device, each of the plurality of SSBs based on the timing sequence of the respective SSB in the first cycle, wherein a time length of the first cycle is equal to a transmission cycle of one of the plurality of SSBs.

2. The method of claim 1, wherein the plurality of SSBs are SSBs of a same cell, and different beams are adopted for the plurality of SSBs, or signal types or signal contents of the plurality of SSBs are different from each other.

3. The method of claim 1, wherein receiving indication information from the network device comprises:

receiving the indication information from the network device on a primary carrier.

4. The signal transmission method of claim 1, wherein the PSS is configured to send a value of an intra-group identity (ID) and an SSS is configured to send a value of a group ID, and a Physical Cell Identity (PCI) is calculated by using the following formula:

$$PCI=N_{ID}^{cell}=3N_{ID}^{(1)}+N_{ID}^{(2)}$$

wherein $N^{(1)}_{ID}$ is a value of a group ID and $N^{(2)}_{ID}$ is a value of an intra-group ID.

5. The signal transmission method of claim 1, wherein the first cycle is a SS burst cycle.

6. A terminal device, comprising:

an input interface, configured to receive indication information from a network device, wherein the indication information is 1-bit indication information and indicates a first group of correspondences from a plurality of groups of correspondences, the plurality of groups of correspondences comprise at least two groups of preconfigured correspondences, each group is a respective group of mappings of a plurality of synchronization signal blocks (SSBs) and timing sequences of the plurality of SSBs in a first cycle, and at least one SSB of the plurality of SSBs has different timing sequences in any two groups of correspondences, wherein the timing sequence of each of the plurality of SSBs is a time-domain resource taken by a respective one of the plurality of SSBs; and each of the plurality of SSBs comprises a primary synchronization signal (PSS), a secondary synchronization signal (SSS) and a Physical Broadcast Channel (PBCH), and the indication information is carried in at least one of a broadcast message, a system message, RRC signaling, media access control (MAC) control element (CE) signaling, or downlink control information (DCI); and a processor, configured to determine a timing sequence of each of the plurality of SSBs in the first cycle based on the indication information;

the input interface being further configured to receive each of the plurality of SSBs based on the received timing sequence of the respective SSB in the first cycle, and wherein a time length of the first cycle is equal to a transmission cycle of one of the plurality of SSBs.

7. The terminal device of claim 6, wherein the plurality of SSBs are SSBs of a same cell, and different beams are adopted for the plurality of SSBs, or signal types or signal contents of the plurality of SSBs are different from each other.

8. The terminal device of claim 6, wherein the input interface is configured to receive the indication information from the network device on a primary carrier.

9. A signal transmission method, the method comprising:

sending, by a network device, indication information to a terminal device, wherein the indication information is 1-bit indication information and indicates a first group of correspondences from a plurality of groups of correspondences, the plurality of groups of correspondences comprise at least two groups of preconfigured correspondences, each group is a respective group of mappings of a plurality of synchronization signal blocks (SSBs) and timing sequences of the plurality of SSBs in a first cycle, and at least one SSB of the plurality of SSBs has different timing sequences in any two groups of correspondences, wherein the timing sequence of each of the plurality of SSBs is a time-domain resource taken by a respective one of the plurality of SSBs; and wherein each of the plurality of SSBs comprises a primary synchronization signal (PSS), a secondary synchronization signal (SSS) and a Physical Broadcast Channel (PBCH), and the indication information is used for the terminal device to determine a timing sequence of each of the plurality of SSBs in the first cycle, and the indication information is carried in at least one of a broadcast message, a system message, RRC signaling, media access control (MAC) control element (CE) signaling, or downlink control information (DCI); and sending, by the network device, each of the plurality of SSBs to the terminal device based on the received indication information, wherein a time length of the first cycle is equal to a transmission cycle of one of the plurality of SSBs.

10. The method of claim 9, wherein the plurality of SSBs are SSBs of a same cell, and different beams are adopted for the plurality of SSBs, or signal types or signal contents of the plurality of SSBs are different from each other.

11. The method of claim 9, wherein sending indication information to the terminal device comprises:

sending the indication information to the terminal device on a primary carrier.

12. The signal transmission method of claim 9, wherein the PSS is configured to send a value of an intra-group identity (ID) and an SSS is configured to send a value of a group ID, and a Physical Cell Identity (PCI) is calculated by using the following formula:

$$PCI=N_{ID}^{cell}=3N_{ID}^{(1)}+N_{ID}^{(2)}$$

wherein $N^{(1)}_{ID}$ is a value of a group ID and $N^{(2)}_{ID}$ is a value of an intra-group ID.

13. The signal transmission method of claim 9, wherein the first cycle is a SS burst cycle.

14. A network device, comprising:
an output interface, configured to send indication information to a terminal device, wherein the indication information is 1-bit indication information and indicates a first group of correspondences from a plurality of groups of correspondences, the plurality of groups of correspondences comprise at least two groups of pre-configured correspondences, each group is a respective group of mappings of a plurality of synchronization signal blocks (SSBs) and timing sequences of the plurality of SSBs in a first cycle, and at least one SSB of the plurality of SSBs has different timing sequences in any two groups of correspondences, wherein the timing sequence of each of the plurality of SSBs is a time-domain resource taken by a respective one of the plurality of SSBs; wherein each of the plurality of SSBs comprises a primary synchronization signal (PSS), a secondary synchronization signal (SSS) and a Physical Broadcast Channel (PBCH), and the received indication information is used for the terminal device to determine a timing sequence of each of the plurality of SSBs in the first cycle, and the indication information is carried in at least one of a broadcast message, a system message, RRC signaling, media access control (MAC) control element (CE) signaling, or downlink control information (DCI);
the output interface being further configured to send each of the plurality of SSBs to the terminal device based on the timing sequence of the respective SSB in the first cycle, and
wherein a time length of the first cycle is equal to a transmission cycle of one of the plurality of SSBs.

15. The terminal device of claim 14, wherein the plurality of SSBs are SSBs of a same cell, and
different beams are adopted for the plurality of SSBs, or signal types or signal contents of the plurality of SSBs are different from each other.

16. The network device of claim 14, wherein the output interface is configured to send the indication information to the terminal device on a primary carrier.

* * * * *